Feb. 19, 1957 O. K. NILSSEN 2,782,325

MAGNETIC FLIP-FLOP

Filed Dec. 6, 1954

INVENTOR.
Ole K. Nilssen
BY Morris Rabkin
ATTORNEY.

United States Patent Office 2,782,325

Patented Feb. 19, 1957

2,782,325

MAGNETIC FLIP-FLOP

Ole K. Nilssen, Collingswood, N. J., assignor to Radio Corporation of America, a corporation of Delaware Application December 6, 1954, Serial No. 473,280

18 Claims. (Cl. 307—88)

This invention relates to signal responsive devices of the type known as bistable trigger circuits or flip-flops in which magnetic elements are employed as basic circuit components.

Magnetic systems have been developed that employ magnetic cores made of material having a substantially rectangular hysteresis curve. These magnetic systems have the advantages of small size, relatively small power supply and relatively long life. A magnetic flip-flop, which performs functions similar to those of electron-tube trigger circuits, is described in the co-pending patent application by M. Rosenberg, Serial No. 317,192, filed October 28, 1952, and assigned to the assignee of this application.

It is among the objects of this invention to provide:

A new and improved signal responsive device having a binary mode of operation in which magnetic elements are used as basic circuit components;

A simple and economical bistable device utilizing magnetic elements;

A simple and reliable trigger circuit employing magnetic cores.

In accordance with this invention, a magnetic flip-flop includes two magnetic elements made of material having a substantially rectangular hysteresis loop. Each element is linked by separate winding means. A transfer circuit connects the two winding means. This transfer circuit includes a capacitor and separate unidirectional charging circuits coupling at least portions of the winding means to the capacitor. The cores are initially in opposite magnetic states with respect to the senses of winding of the winding means. An input current pulse applied to at least a portion of each of the winding means changes the magnetic state of a first one of the elements and the capacitor is charged during the change of state of that element. Upon termination of the input pulse the capacitor discharges through the winding means linked to the second element to change its magnetic state. The next input pulse changes the state of the second element back to its initial state, and a pulse is transferred by the transfer circuit to the winding means of the first element to change it back to its initial state.

The foregoing and other objects, the advantages and novel features of this invention, as well as the invention itself, both as to its organization and mode of operation, may be best understood from the following description when read in connection with the accompanying drawing, in which like reference numerals refer to like parts, and in which.

Figures 1, 2:
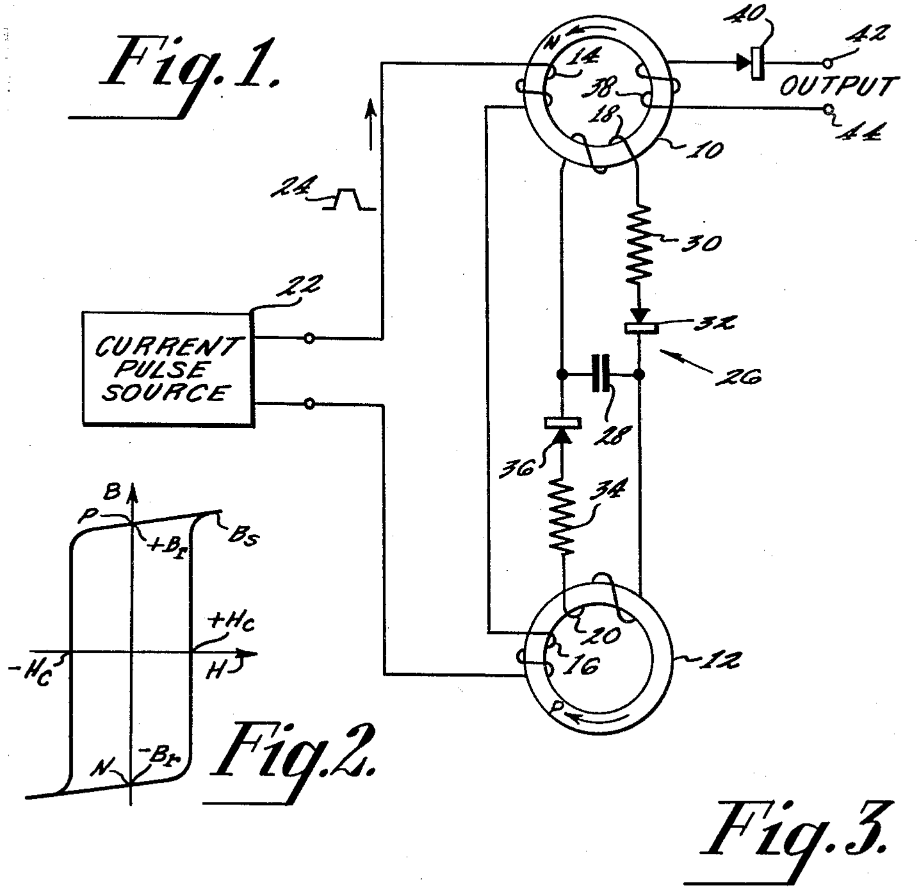
Figure 1 is a schematic circuit diagram of a magnetic flip-flop embodying this invention.
Figure 2 is an idealized graph of the hysteresis curve of magnetic materials used for the cores of the flip-flop in Figure 1.

In Figure 1 a magnetic flip-flop is shown that includes two magnetic cores 10, 12. The cores are preferably made of a material that has a substantially rectangular hysteresis curve of the type shown in Figure 2. Desirable characteristics of the core material are a high saturation flux density $B_s$, a value of residual flux density $B_r$, and a low coercive force $H_c$. Opposite magnetic states or directions of flux in the cores are represented by P and N. The saturation flux density $B_s$ is substantially the same as the residual flux density $B_r$. Therefore, if a magnetizing force in the positive direction is applied to a core which is in the positive remanent state P, essentially no change in the core flux density takes place. Ideally, if the magnetizing force in a flux reversing direction is less than the threshold of the coercive force $H_c$, the flux density B does not change below the knee of the curve, and the residual magnetism $B_r$ is unchanged. In practice, the magnetic cores 10, 12 conform sufficiently to the ideal to have two remanent states of stability.

Each core 10, 12 has a separate input winding 14, 16 and a separate transfer winding 18, 20 linked to it. The input windings 14, 16 are connected in series and to a source 22 of current pulses 24. The source 22 may be any appropriate form of current generator and switching device (not shown) for producing current pulses 24. The transfer windings 18, 20 are coupled in a circuit 26. This transfer circuit 26 includes a storage capacitor 28 which is connected in a charging circuit to the first core winding 18 through a resistor 30 and a diode 32 and in another charging circuit to the second core winding 20 through another resistor 34 and diode 36. The diodes 32 and 36 are poled to charge the capacitor 28 in opposite directions and to block discharge of the capacitor 28 through the same circuit from which it was charged. An output winding 38 is linked to the first core 10 and is connected at one end through a diode 40 to one output terminal 42 and at the other end to another output terminal 44.

Figure 3:
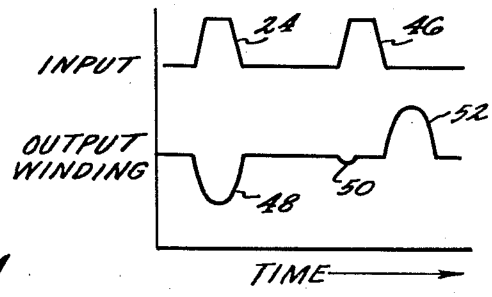
Figure 3 is an idealized graph of the time relationship of waveforms occurring in the circuit of Figure 1.

Initially the cores are magnetized to opposite states P and N. The first core 10 is assumed to be in the negative state N, and the second core 12 is assumed to be in the positive state P as indicated by the arrows on the cores. The first current pulse 24 that is applied to the input windings 14, 16 produces positive magnetizing forces in both cores 10, 12. The second core 12 is already substantially saturated in state P and, therefore, substantially unaffected by the first pulse 24. The first core 10 is driven from state N to state P by the first pulse 24. The resulting voltage induced in the transfer winding 18 charges the capacitor 28 through the diode 32 in the forward direction. The input pulse 24 terminates when the first core 10 is in the P state of substantial saturation. While the first core 10 is changing state, any current flow in the second core transfer winding 20 does not affect the state of the second core 12 because the input pulse 24 is flowing in the winding 16. After termination of the input pulse, the capacitor 28 discharges through the second core transfer winding 20 and diode 36. The diode 32 blocks discharge back through the first core winding 18. The discharge of the capacitor 28 through the second core winding 20 causes the second core 12 to change to state N. Both cores again have relatively opposite stable magnetic states which are the reverse of the initial states. When the second input pulse 46 (Figure 3) occurs, the first core 10 is not affected, and the second core 12 is driven back to its initial state P. The resulting voltage induced in the transfer winding 20 charges the storage capacitor 28. Upon termination of the second pulse 46, the capacitor 28 discharges through the first core transfer winding 18 to return the first core 10 to state N. Both cores 10 and 12 are then in their initial states and remain in these states until the next input pulse.

The change of flux of the first core 10 from N to P at the time of the first input pulse 24 induces a voltage pulse 48 (Figure 3) in the output winding 38. The second input pulse 46 causes a pulse 50 of negligible amplitude to be induced in the output winding 38 corresponding to the small change of flux density from $+B_r$ to $+B_s$. Upon termination of the second pulse 46, a positive pulse 52 is induced in the output winding 38 when the first core 10 is restored to its initial state N. Thus, different outputs are produced corresponding to the two operating conditions of the flip-flop. Either the negative output pulse 48 or the positive output pulse 52 may be used as the output of the flip-flop. As shown in Figure 1 the diode 40 may be poled to pass only the positive pulse 52. Thereby, a better signal to noise ratio is achieved, because the input pulse 46 is terminated when the output pulse 52 is produced, and spurious pulses of small amplitude, such as the pulse 50, are blocked by the diode 40.

To facilitate the analysis of the flip-flop circuit of Figure 1, it may be assumed the voltages induced in the transfer windings 18 and 20 are in the form of rectangular waves or no voltage change depending upon whether or not the associated core changes its magnetic state. This assumption is an approximation which permits a simplified explanation of circuit operation. The duration of the input current pulse 24 or 46 is arranged to be substantially equal to the time required for a core 10 or 12 to complete its travel along the vertical portion of the hysteresis loop. Thus, the input current pulse terminates when the induced transfer winding voltage becomes zero. The time constant $$\frac{RC}{2}$$

of each charging circuit (where R includes the resistor 30 or 34 and the forward resistance of the diode 32 or 36) is arranged to be appreciably less than the duration of the rectangular wave output of the transfer winding 18 or 20. If the induced voltage in the transfer winding is $E_0$, the capacitor is charged to $$\frac{E_0}{2}$$

with a charge of $$\frac{CE_0}{2}$$

because of the voltage division by the two resistor-diode combinations in series.

When the capacitor 28 discharges, the discharge current I is substantially constant, because of the substantially constant magnetizing force NI accepted by the core as it travels over the vertical portion of the hysteresis loop. The voltage across the capacitor decreases linearly, and the voltage across the transfer winding receiving the discharge current is the capacitor voltage less the voltage drop across the resistance R. If A volt-microseconds are required to reverse the state of a core, and the time to reverse that state is T, then the volt-time integral A is equal to $$\left(\frac{E_0}{2}-IR\right)\frac{T}{2}$$

The difference in charge of the capacitor 28 upon the completion of the reversal of the core state, $$\frac{CE_0}{2}-CIR$$

is made substantially equal to the total discharge current IT during core reversal for efficient operation. From these relationships appropriate values of R and C may be derived.

The transfer circuit 26 is effectively an integrator. During an input pulse and the change of state of one core, volt-microseconds are, in effect, stored by the capacitor 28, which volt-microseconds are sufficient to reverse the state of the other core completely.

Figure 4:
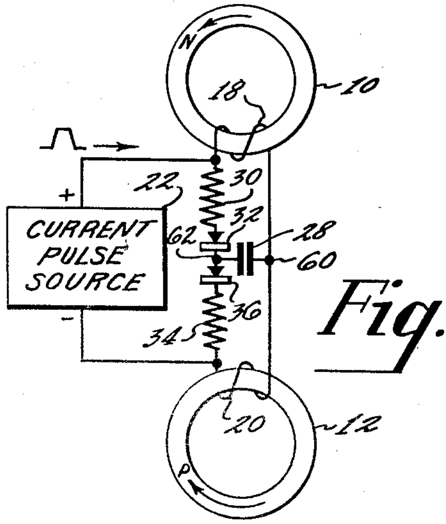
Figure 4 is a schematic circuit diagram of a modification of the circuit of Figure 1.

In Figure 4 a modification of the trigger circuit of Figure 1 is shown. Parts corresponding to those previously described are referenced by the same numerals. One terminal of the first core winding 18 is connected directly to a terminal of the second core winding 20 at junction 60. The other terminal of the first core winding 18 is connected through the resistor 30, the diodes 32 and 36, and the resistor 34, all in series, to the other terminal of the second core winding 20. The diodes 32 and 36 are poled to pass current in the same direction through the series combination. The capacitor 28 is connected between the junction 62 of the diodes 32, 36 and the junction 60. The current pulse source 22 is connected across the series combination of the resistors 30, 34 and the diodes 32, 36. The senses of linkage of the windings 18 and 20 is such that current flow from the source 22 passes through the windings 18 and 20 in a direction such as to tend to turn both cores to state P.

It is assumed that initially the first core 10 is in state N, and the second core 12 is in state P. An input pulse will change the core 10 to state P and drive the second core 12 further into saturation in state P. During the interval of the input pulse there is current flow through the series combination of the resistors 30, 34 and the diodes 32, 36. Since the second core 12 is in saturation during the input pulse, there is a negligible voltage drop across the winding 20. Therefore, the voltage at the junction 62 is positive with respect to the voltage at junction 60 and substantially equal to the voltage drop across the resistor 34, assuming that the voltage drop across the diodes 36 in the forward direction is negligible. Thus, during the input pulse, while the first core 10 is turning over, the capacitor 28 is being charged with the junction 62 at a relatively positive potential. When the input pulse terminates, the capacitor 28 discharges through the diode 36 and the second core winding 20. The direction of discharge current is such that the state of the second core 12 is reversed to state N. The high back resistance of the diodes 32 blocks discharge in the opposite direction through winding 18. The next input pulse reverses the second core 12 to state P (its initial state) and leaves the first core 10 unaffected in state P. The capacitor 28 is again charged, but this time in the opposite direction. The junction 62 is negative with respect to the junction 60 by an amount substantially equal to the voltage drop across resistor 30 during reversal of the second core 12 to state P. The input pulse terminates with the change of the second core to state P, and the capacitor 28 discharges. The direction of positive discharge current flow is from junction 60 through the winding 18 and diode 32 to the junction 62 to reverse the state of the first core 10 to its initial state N. The diode 36 blocks discharge current flow in the opposite direction through the winding 20. Thus, the circuit of Figure 4 has a binary mode of operation similar to that of Figure 1. Output pulses may be derived from the circuit of Figure 4 in a manner similar to that described above for Figure 1.

It is seen from the above description of this invention that an improved and simple magnetic device is provided that has a binary mode of operation. The magnetic device has two stable operating conditions and may be employed as a trigger circuit.

What is claimed is:

1. A magnetic device comprising a plurality of magnetic elements each having two magnetic states, separate winding means linked to said elements for applying magnetizing forces thereto, means for simultaneously applying energizing input currents to at least portions of said winding means in directions such as to tend to change the state of only one of said elements, and means responsive to changes of state of one and another of said elements for respectively applying energizing currents to at least portions of said winding means of said another and said one elements, said responsive means including a storage capacitor, and separate unilateral impedance means each connected in series with at least a portion of a different one of said winding means and said capacitor.

2. A magnetic device as recited in claim 1 wherein each of said winding means includes an input winding and a transfer winding, said input windings being connected in series to receive said simultaneously applied input currents, and said transfer windings being connected to said capacitor through said unilateral impedance means.

3. A magnetic device as recited in claim 1 wherein said winding means portions to which said input currents are simultaneously applied are connected to said capacitor through said unilateral impedance means.

4. A magnetic device comprising a plurality of magnetic elements each having two magnetic states, separate winding means linked to said elements for applying magnetizing forces thereto, and means for applying energizing currents to one and another of said winding means incident to a change of state of said another and said one elements respectively, said current applying means including a storage capacitor, and separate unilateral impedance means each coupling a different one of said winding means to said capacitor.

5. A magnetic device as recited in claim 4 wherein each of said unilateral impedance means is poled to provide a capacitor charging path from a different one of said winding means and to block capacitor discharge in the charging direction.

6. A magnetic device as recited in claim 4 wherein said winding means and said unilateral impedance means are connected in a series circuit, said unilateral impedance means being poled in the same direction in said series circuit, said capacitor being connected to a terminal between said unilateral impedance means.

7. A magnetic device as recited in claim 6 and further comprising means for simultaneously applying currents to said unilateral impedance means in the forward direction thereof and to said winding means in directions such as to tend to change the state of only one of said elements.

8. A magnetic device as recited in claim 6 and further comprising separate input windings linked to said elements, and means for simultaneously applying energizing currents to said input windings in directions such as to tend to change the state of only one of said elements.

9. A magnetic device as recited in claim 4 wherein said unilateral impedance means are poled to charge said capacitor in opposite directions incident to a change of state of one and another of said elements respectively.

10. A magnetic device comprising a plurality of magnetic elements each having two magnetic states, separate windings linked to said elements, means for simultaneously applying energizing input currents to said windings, and means for applying energizing currents to said windings of one and another of said elements incident to changes of state of said another and one of said elements respectively and upon termination of said input currents, the amplitudes of said energizing currents being sufficient to change the states of said elements.

11. A magnetic device comprising a plurality of magnetic elements each having two magnetic states, separate windings linked to two of said elements, means for simultaneously applying energizing input currents to said windings in directions such as to tend to change the state of a first one of said two elements, and means responsive to a change of state of a first one of said two elements for applying energizing currents to said winding of the second one of said two elements in a direction such as to tend to change the state of said second element upon termination of said input currents.

12. A magnetic device comprising two magnetic elements each having two magnetic states, input winding means for applying magnetizing forces to said elements substantially simultaneously, the polarities of said magnetizing forces being such as to tend to change the state of only one of said elements, and means responsive to changes of magnetic state of one and the other of said elements for respectively applying state changing magnetizing forces to said other and said one magnetic elements, said responsive means including separate transfer winding means linked to each of said elements, a storage capacitor connected across said transfer winding means, and a plurality of unilateral impedance means each connected in series with a different one of said transfer winding means and said capacitor.

13. A magnetic device comprising a plurality of magnetic elements each having two remanent states of substantial saturation, input means linked to a first and a second one of said elements for applying magnetizing forces thereto substantially simultaneously, the polarities of said applied forces being such as to tend to change the state of only one of said first and second elements, and means responsive to changes of state of one and the other of said first and second elements for respectively applying state changing magnetizing forces to the other and the one of said first and second magnetic elements, said responsive means including separate transfer winding means linked to said first and second elements, integrating means coupled between transfer winding means, and a plurality of unilateral impedance means each connected in a different series circuit with a different one of said transfer winding means and said integrating means.

14. A magnetic device comprising a plurality of magnetic elements each having two remanent states of substantial saturation, input means linked to a first and a second one of said elements for applying magnetizing forces thereto substantially simultaneously, the polarities of said applied forces being such as to tend to change the state of only one of said first and second elements, and means responsive to changes of state of one and the other of said first and second elements for respectively applying state changing magnetizing forces to the other and one of said first and second elements, said responsive means including separate transfer windings linked to said first and second elements, capacitance means, and separate unilateral charging paths coupling said transfer windings to said capacitance means, the directions of said charging paths being such as to block discharge of said capacitance means through the path from which said capacitance means is charged.

15. A magnetic trigger circuit comprising two magnetic cores having substantially rectangular hysteresis characteristics, separate input windings linked to said cores with the same sense of linkage, a source of current pulses connected in a series circuit with both of said input windings, separate transfer windings linked to said cores, a storage capacitor, a resistor and a diode connected in a series circuit with one of said transfer windings and said capacitor, another resistor and anode diode connected in another series circuit with the other of said transfer windings and said capacitor, said diodes being poled to block discharge of said capacitor through the associated series circuits, an output winding linked to one of said cores, and means coupled to said output winding for deriving output pulses of one direction.

16. A magnetic device comprising a plurality of magnetic elements each having two directions of residual magnetization, separate windings linked to said elements, circuit means connected to said winding of a first one of said elements for applying energizing signals thereto in a direction tending to change the direction of magnetization of said first elements, and additional circuit means connecting said first element winding to a winding of a second one of said elements for applying energizing signals to said second element winding after a change in the direction of magnetization of said first element, said additional circuit means including electrical storage means connected in separate circuits with said first element winding and said second element winding.

17. A magnetic device as recited in claim 16 wherein said electrical storage means includes a capacitor.

18. A magnetic device as recited in claim 17 wherein each of said separate circuits includes a different unidirectional element, said unidirectional elements being connected in the same series circuit with said first and second element windings and poled to pass current in the same direction.

References Cited in the file of this patent

UNITED STATES PATENTS

| | | |
|---|---|---|
| 2,652,501 | Wilson | Sept. 15, 1953 |
| 2,720,597 | Stuart-Williams et al. | Oct. 11, 1955 |

OTHER REFERENCES

Publication: Convention Record of the I. R. E., March 1953, part 7, page 38, "Magnetic Shift Register Using One Core Per Bit."